United States Patent [19]

Shah et al.

[11] 4,277,436
[45] Jul. 7, 1981

[54] METHOD FOR FORMING FILAMENTS

[75] Inventors: Hashmuk G. Shah, Granville; G. Richard Machlan, Newark, both of Ohio

[73] Assignee: Owens-Corning Fiberglas Corporation, Toledo, Ohio

[21] Appl. No.: 57,138

[22] Filed: Jul. 12, 1979

Related U.S. Application Data

[63] Continuation of Ser. No. 900,408, Apr. 26, 1978, abandoned.

[51] Int. Cl.³ .............................. D01D 5/12; B29C 6/00
[52] U.S. Cl. .......................................... 264/518; 65/6; 65/8; 65/14; 264/176 F; 264/210.8; 425/8
[58] Field of Search ................ 264/176 F, 518, 210.8, 264/8, 12, 13; 425/7, 8; 65/6, 8, 14

[56] References Cited

U.S. PATENT DOCUMENTS

| 2,212,448 | 8/1940 | Modigliani | 65/6 |
| 2,336,743 | 12/1943 | Manning | 264/DIG. 75 |
| 2,433,000 | 12/1947 | Manning | 264/DIG. 75 |
| 3,621,531 | 7/1969 | Feltgen et al. | 425/725 |
| 4,046,539 | 9/1977 | Pitt | 65/6 |

Primary Examiner—Jay H. Woo
Attorney, Agent, or Firm—Ronald C. Hudgens; Robert F. Rywalski; Greg Dziegielewski

[57] ABSTRACT

Method and apparatus for forming filaments are provided by centrifugally forming a veil of primary fibers or streams of material and moving a fluid along a path within the veil at a velocity sufficient to attenuate said primary fibers into filaments.

8 Claims, 2 Drawing Figures

METHOD FOR FORMING FILAMENTS

This is a continuation of application Ser. No. 900,408 filed Apr. 26, 1978, now abandoned.

BACKGROUND OF THE INVENTION

The present invention relates to an improved method and apparatus for centrifugally forming filaments from molten glass or other thermoplastic materials such as polyester and polypropylene.

It is well known in the art to produce large quantities of fibers by supplying a stream of molten material to a high speed centrifuge or rotor having a plurality of orifices about its peripheral face through which the molten material flows by centrifugal force. The eminating streams of material are then subjected to a gaseous blast to attenuate the molten streams or primary fibers into fine filaments.

The production rate at which filaments may be formed is a function of the number of orifices about the rotor periphery. To increase the number of orifices it is generally necessary to increase the peripheral surface area of the rotor where the orifices are located. The peripheral surface area can be increased by increasing the depth of the rotor and/or increasing the diameter thereof. Also the production rate can be increased by manipulating the size of the orifices in the rotor and the force generated by the gaseous attenuation blast and/or the speed of the rotor.

Increasing the rotor depth can cause material flow and thermoequilibrium problems resulting in undesirable fiber properties. On the other hand, by increasing the rotor diameter, the fluid dynamics downstream of the rotor may be adversely affected. The low pressure region directly downstream of the rotor influences the stability of the primary fiber/filament veil in that the unstable veil tends to wobble aimlessly about the downstream extension of the rotor's axis of rotation. Such wobbling can affect the flow parameters in the attenuation zone and coarse non-uniform and undesirable filaments can be produced thereby.

The phenomenon of veil instability is not necessarily restricted to large diameter rotors. Generally speaking, the instability phenomenon may be observed for various attenuating momentums depending upon the vortex strength immediately downstream of the rotor.

Typical prior art disclosing techniques aimed at diminishing the effect of the low pressure region downstream of the rotor may be found in U.S. Pat. Nos. 3,114,618; 3,285,723; 3,179,507; 3,372,011; 2,855,626; 3,040,337; and 4,046,539.

SUMMARY OF THE INVENTION

According to this invention, there is provided method and apparatus for attenuating streams of molten material into filaments by centrifugally forming a veil of streams of filament foaming material and moving a fluid along a path within the veil at a velocity sufficient to attenuate said streams into filaments.

Accordingly, it is a general object of the present invention to provide an internal blower capable of attenuating said primary fibers into filaments.

The foregoing, as well as other objects of the present invention, will become apparent to those skilled in the art from the following detailed description.

DESCRIPTION OF THE PREFERRED EMBODIMENTS

Figure 1:
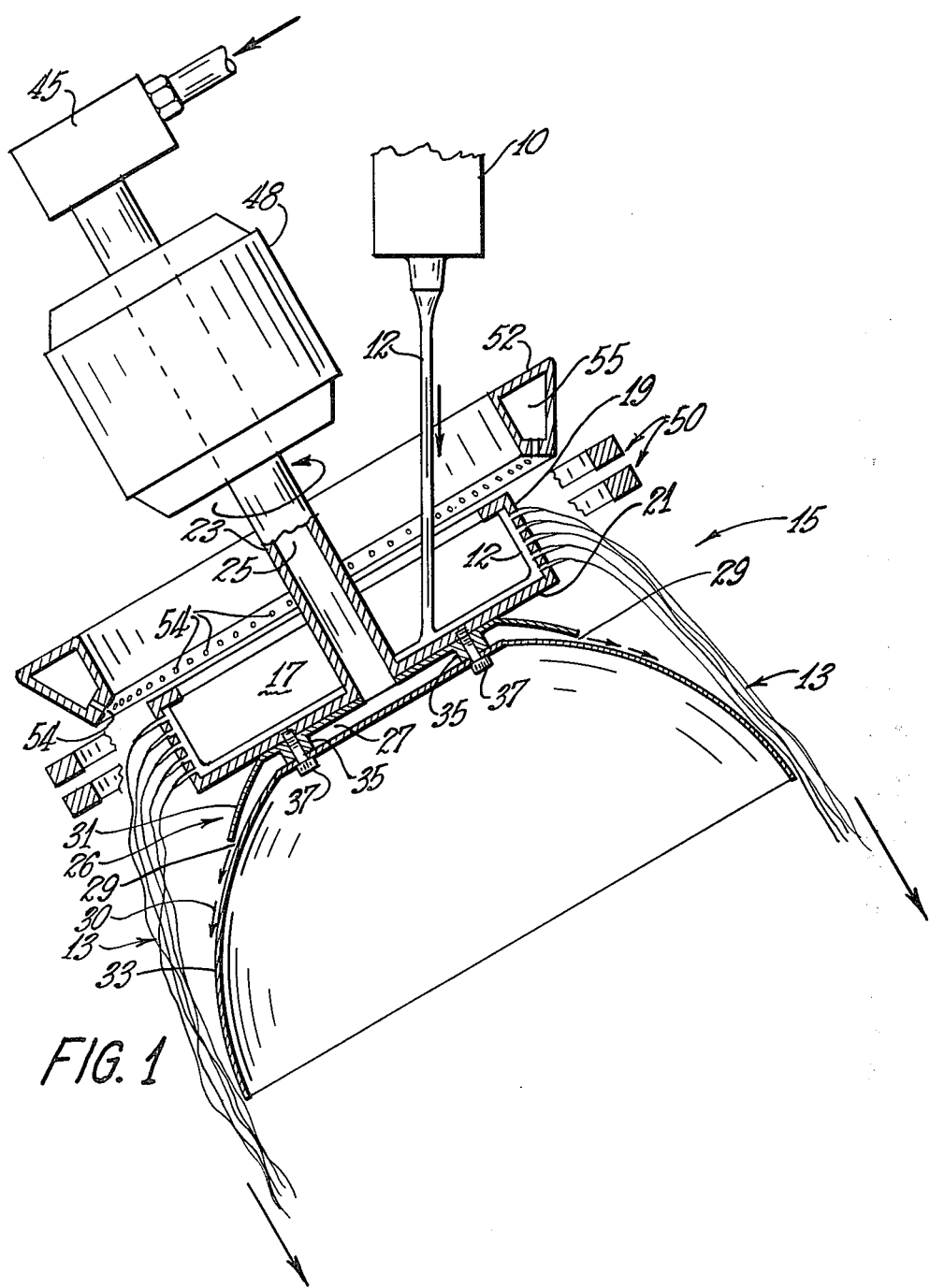
FIG. 1 is a side cross-sectional representation of a filament forming position according to the principals of this invention.

As shown in FIG. 1, feeder 10 is adapted to deliver a stream of molten material 12 to rotary or centrifugal fiberizer assembly 15 whereat streams of molten material issuing from the rotor are attenuated into a plurality of filaments 13. The rotary fiberizer assembly 15 is comprised of a container 17 and a hollow tubular shaft or quill 23 which is attached to base 21 of container 17. Perforated wall 19 is joined to base 21 and extends upwardly therefrom to form container or rotor 17.

Passageway 25 which extends through quill 23 is in communication with cavity 27 of first or internal fluidic attenuation means or surface effect blower 26.

First blower 26 is comprised of a first dish shaped member or cap 31 in abutting relationship with base 21. Cavity 27 is formed between first member 31 and arcuate second member or dome 33. Second or conically shaped member 33 is held fixedly in spaced relationship from first member 31 by means of a plurality of bosses 35 projecting from first member 31. The first blower 26 is fastened to the rotary fiberizer 15 at base 21 thereof by a plurality of screws 37 extending through second member 33 and first member 31 in threaded engagement with base 21 of container 17.

The ring-like void 29 or exit orifice 29 can be adjusted to modify the fluid flow rate and the like by means of shims (not shown) between the second member 33 and bosses 35.

As shown in FIG. 1, the smaller end of the second member or dome 33 is located at the base of rotor 17 with the section having the larger outside diameter being located downstream thereof.

The distal end of shaft 25 is joined with rotational fluidic coupling 45 which is connected to a suitable supply of pressurized fluid or gas (not shown) such as air. Coupling 45 provides a supply of pressurized fluid to the first blower 26 by means of passageway 25. With the first blower 26 being located at base 21 within the veil of filaments 13, the hollow quill 23 by means of passageway 25 in communication with cavity 27 and annualar ring-like-void 29 forms a conduit having its discharge opening within the veil of fibers 13 beneath rotor 15 to provide a stream of fluid substantially tangent to the external surface of member 33.

Motive means 48 is adapted to rotate the fiberizer assembly 15 at a speed sufficient to centrifugally form a veil of molten streams or primary fibers which can be ultimately attenuated into filaments 13.

Induction heating element 50, which surrounds the periphery of rotor 17 serves to maintain the rotor 17 and material 12 at the proper thermal condition.

A second or external blower or fluidic attenuation means 52 having a plurality of orifices 54 located therein is adapted to provide a gaseous blast external to the veil of filaments 13. The second blower 52 can be of the type well known in the rotary fiber forming art. As such, a cavity or plenum 55 which is suitably connected with a suitable supply of pressurized fluid or gas (not shown), such as air, delivers the working fluid to orifices 54 which are oriented to deliver a gaseous blast external to the primary veil of fibers/filaments 13 generally inwardly and downwardly with respect to the rotor along the axis of rotation of the rotor in contact with the veil at a velocity sufficient to attenuate the primary fibers into filaments.

This system offers several important advantages. The internal blower 26, as disclosed herein, provides a system capable of producing filaments having a smaller diameter than by a system only employing a second or external blower as is common practice in the art. Or, filaments of otherwise approximately the same diameter can be formed by a rotor having larger diameter orifices located therein. This provides a system for substantially increasing the throughput of a rotary fiber forming position. In addition, the low pressure zone generally formed beneath the rotor is substantially eliminated or reduced due to the injection of the working fluid 30 moving along the external surface of the second member or dome 33 which reduces the tendency of a lower pressure zone to form beneath the dome and/or rotor. Thus the veil is kept open. That is, this system reduces the tendency of the veil to collapse and the filaments to converge as a tow, which is important in the formation of matts or packs having a uniform distribution of filaments.

Furthermore, the geometric configuration of the veil is substantially independent of the velocity of the working fluid 30 of the internal blower 26. The geometric shape of the veil as the filaments move downstream from the second member 33 is believed to be primarily dependent upon the shape of the second member 33, assuming the kinetic energy of the external gaseous blast is substantially constant. That is, a system is provided wherein production rates and filament diameters may be varied by adjusting the rotor rpm and the velocity of the working fluid by adjusting the air pressure delivered to the internal blower in the absence of substantially changing the shape of the veil. Thus the geometric shape of the veil of filaments is essentially fixed since the shape of the dome is fixed. Although, domes of various shapes and sizes can be effectively employed.

The first or internal blower 26 is designed to take advantage of the coanda effect to control the working fluid in this system. Thus, the working fluid is moved along a predetermined path in contact with the veil substantially along the length of the axis of rotation of the rotor within the interior of the veil at a velocity sufficient to attenuate the primary fibers into filaments.

In some instances the external second blower 52 can be dispensed with and filaments can be formed employing only the internal blower 26.

The dome 33 is not absolutely necessary in all instances, since it has been found that an internal blower adapted to provide a stream of high velocity gas moving downward along the axis of rotation of the rotor in contact with the veil is sufficient to attenuate the filaments which are entrained within said stream. But, in the absence of the member 33, the air is not moved along a fixed predetermined path for a fixed predetermined distance beneath the rotor. That is, the working fluid may be essentially uncontrolled after it leaves the orifices of the internal blower. Such a system can cause the veil of fibers to expand beyond the shape and limits desired. Therefore, it is preferred that the internal blower 26 be provided with a second member 33 having a surface extending a distance axially downward from the base of the rotor to provide an important degree of control.

Furthermore it is preferred that the internal blower 26 be designed such that the first member or cap 31 be positioned such that the primary fibers should not normally come in contact therewith. In systems where the largest OD of the dome 33 is larger than the OD of the rotor 17, it is important that the area or surface of the blower that is likely to be contacted by the still tacky filaments be washed by a high velocity stream of working fluid to promote a self cleaning action with respect to the surface of the blower.

Of course it is not necessary that the largest OD of the internal blower 26 be greater than the OD of the rotor 17. This invention can work in systems wherein the largest OD of the internal blower, measured in a plane perpendicular to the axis of rotation, is equal to or less than the OD of the rotor. The resulting diameter of the veil of filaments taken through a plane substantially perpendicular to the axis of rotation of the rotor should be merely smaller than it would otherwise be if the OD of the blower were larger than the rotor.

It is believed that the principals of this invention apply equally as well to forming inorganic as well as organic filaments. That is, inorganic materials such as glass are believed to be fiberizable according to the principals of this invention as well as organic materials such as polycarbonate, polystyrene, polypropylene, polyethylene and polyester and the like.

It has been shown that the internal blower system as disclosed herein operates to attenuate the primary fibers into filaments, separate the filaments from one another, and keep the veil open rather than having the veil collapse into a tow or to form clumps of filaments.

As can be seen in FIG. 1, the geometric shape of dome 33, as taken in a side-elevational cross-section, roughly approximates the path of the primary fibers from the point at which they leave the rotor to the point at which the filaments move downstream from the dome 33. That is, the path of the primary fibers initially extends substantially radially outward and then the filaments move along a line substantially parallel to the axis of rotation of the rotor. Employing blower 26, the working fluid moves along a path substantially transverse with respect to the axis of rotation of the rotor, and then the advancing fluid is directed to move substantially parallel to the axis of rotation due to the coanda effect along the surface of the dome 33. This provides a smooth continuous blend of fluid and filaments for a continuous operation.

The veil of filaments, as shown in FIG. 1, separates or leaves the direct influence of the dome-shaped member 33 at the distal end thereof. And it is believed that the internal angle formed between path of the fluid 30 containing veil of filaments 13 at the zone (i.e. distal end of member 33) at which the veil of filaments moves away or separates from the surface of dome 33 and the axis of rotation of the rotor, as measured in a plane containing such axis, should be less than 45 degrees or even less than 20 degrees. It is believed that such an angle should fall within a range from 0 to 10 degrees, 0 degrees being substantially parallel to the axis of rotation of the rotor for systems without extented surfaces as shown in FIG. 2.

It has been found that the minimum working fluid velocity along the surface of the second member 33 should be greater than or equal to approximately 3,000 feet per minute. However, it has been found that working fluid velocities of 4,500 feet per minute to 6,000 feet per minute and above have proved to be superior in some circumstances.

Trial No. 1

Filament Material—Polyester
    Intrinsic Viscosity—0.62
    Temp at Rotor—550° F.
    Feed Rate—11 LBS./HR.
Rotor
    O.D.—4 in.
    No of Holes—147
    Hole I.D.—0.040 in.
    RPM—3500
    Temp—850° F.
Internal Blower
    O.D. at Base—8 in.
    Approx. Length
    (From Bottom of Rotor)—4¾ in.
    Transverse Radius Of Curvature—6 in.
    Air Supply Pressure—80 psi
    Air Velocity—6000 FPM
External Blower
    Air Supply Pressure—13 psi
    Approx. Air Velocity—200 FPM Trial No. 2

Filament Material—Polyester
    Intrinsic Viscosity—0.62
    Temp. at Rotor—550° F.
    Feed Rate—11 LB/HR.
Rotor
    O.D.—4 in.
    No. of Holes—147
    Hole I.D.—0.040 in.
    RPM—4200
    Temp—835° F.
Internal Blower
    O.D. at Base—5⅜ in.
    Approx Length
    (From Base Of Rotor)—4¾ in.
    Transverse Radius of Curvature—3 in.
    Air Supply Pressure—72 psi
    Air Velocity—6500 FPM
External Blower
    Air Supply Pressure—13 psi
    Air Velocity—200 FPM It has been found that in trials similar to those set forth in Trials No. 1 and 2 that wherein only the external blower was used, the resulting filaments were approximately 28.7% smaller in diameter than the ID of the holes in the spinner. When the internal blower was used in conjunction with the external blower it was found that the average filament diameter was approximately 58% smaller than the diameter of the holes in the rotor wall.

Figure 2:
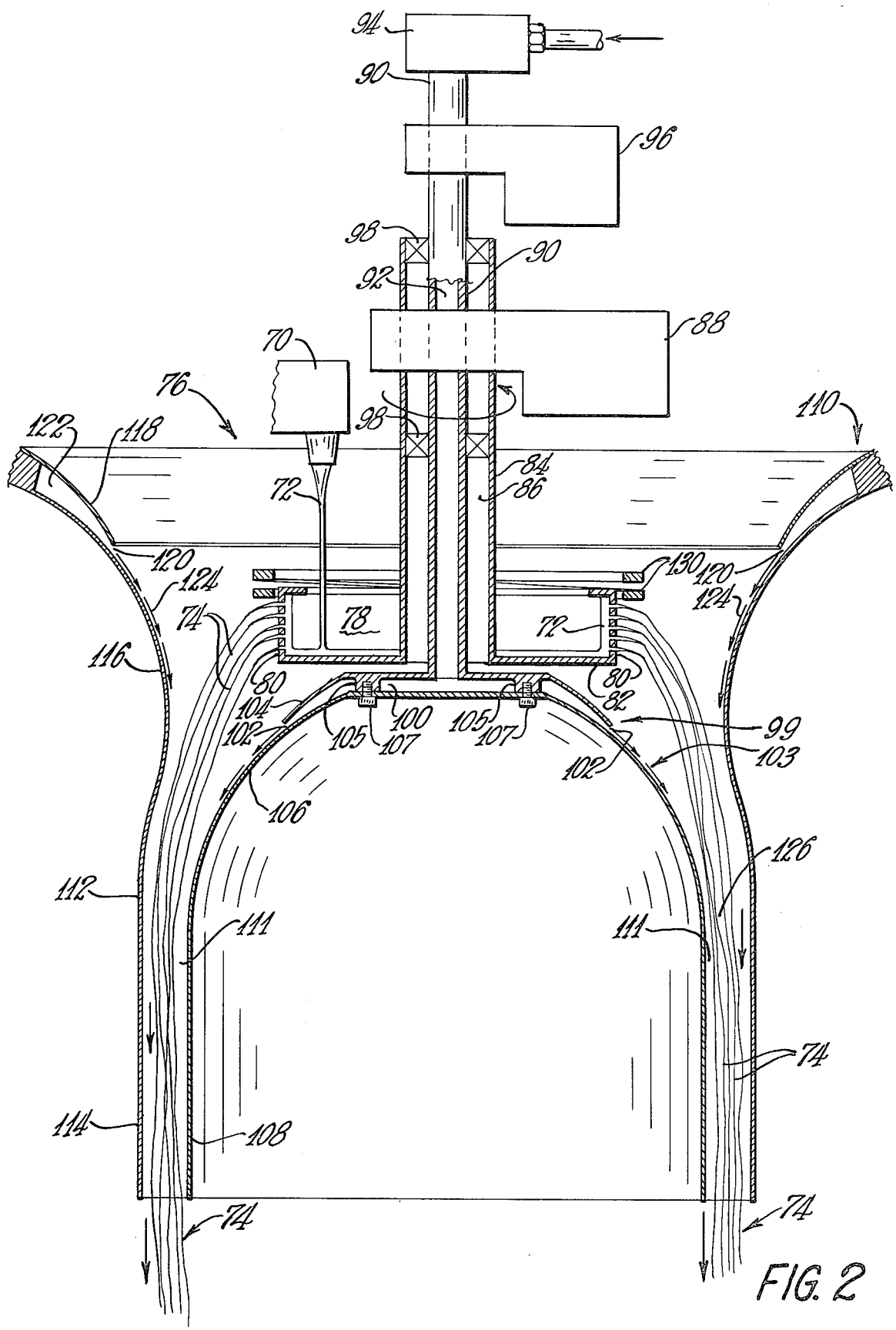
FIG. 2 is a side cross-sectional representation of a similar filament forming position to that shown in FIG. 1.

Between the forming system represented in FIGS. 1 and 2, the main differences are that the internal blower is independent of the rotor and can be held stationary or rotated in either direction with respect to the rotor; the dome-shaped member of the internal blower has an extended cylindrical section that is substantially concentric with the axis of rotation of the rotor; and an external surface effect blower has been provided with extended portions to form a torroidally shaped zone through which the filaments are advanced.

As shown in FIG. 2, feeder 70 is adapted to supply a stream of molten material 72, such as glass or polymer, to rotary fiberizer assembly 76 to form a veil of filaments 74. The rotary fiberizer assembly 76 is comprised of a first tubular shaft or quill 84 having bore 86 extending therethrough which is attached at one end to base 82 of container 78. Perforated wall 80 is joined to base 82 to form container 78. The molten material 72 passes through the orifices in the perforated wall 80 due to centrifugal force forming a veil of streams of molten material or primary fibers which are then further attenuated to form a veil of filaments 70 through the action of the gaseous blasts of the internal blower assembly 99 and external blower assembly 110.

Rotor or container 78 is rotated at high speed by motor 88 which is suitably connected to shaft 84.

Second tubular member or hollow shaft 90 having passageway 92 extending therethrough is concentrically, rotatably located within bore 86 of shaft 84 by means of bearings 98.

The distal end of shaft 90 is adapted to accommodate rotational fluidic coupling 94 which is connected to a suitable supply (not shown) of pressurized fluid such as air.

Passageway 92 is in communication with cavity 100 formed between first member or cap 104 and second arcuate or dome shaped member 106. Bosses 105 projecting from the under surface of first member 104 and shims (not shown) provide the spacing between first member 104 and second member 106 to form annular or ring-like nozzle 102 through which a first fluid stream 103 is discharged substantially tangent to the arcuate section of the second member 106 at a velocity sufficient to attenuate the primary fibers into filaments similar to that in FIG. 1. The second member or dome 106 is suitably fastened to first member 104 by means of screws 107 or any suitable fastening device. Dome-shaped member 106 has an extended section 108 to provide a cylindrical section substantially concentric with the axis of rotation of the rotor at a distance from approximately ½ to 2 outside diameters of the rotor downstream from the bottom wall of the rotor.

External surface effect blower assembly 110 is positioned with respect to the internal blower assembly 99 to form a torroidal passageway or zone 111 through which the filament 74 are advanced to enhance the control over the working fluid or fluids.

The external blower assembly 110 is comprised of a conically-shaped upper member 118 spaced from a tubular member or surface 112 to form a plenum or chamber 122 which is connected to a suitable supply (not shown) of pressurized fluid such as air.

The annular slot or ring-like nozzle 120, formed by upper member 118 and the arcuate converging section 116 of the tubular member 112, directs a high velocity stream of gas along the innersurface of the external blower assembly 110.

The arcuate converging section 116 of the external blower 110 is adapted to urge the streams of molten material expelled from the rotor in a substantially radial direction to a path generally along the axis of rotation of the rotor by the effect of the second stream of fluid being directed and moved downwardly and inwardly with respect to the rotor in contact with such streams. Subsequently, the second fluid is directed or moved by the coanda effect along extended portion 114 in contact with the veil substantially parallel to the path of the first fluid which is in turn substantially parallel to the axis of rotation of the rotor.

Extended portion 114 depends from arcuate converging section 116 substantially concentric with extended section 108 of the internal blower 99 such that extended portion 114 is substantially parallel to extended section 108 of internal blower 99 along the length thereof to form a torroidal zone or passageway 111.

The external blower assembly 110 is adapted to provide a second stream of working fluid 124 in contact with the veil of filaments moving in the general direction of filament advancement along the innersurface of tubular member 112 at a velocity sufficient to attenuate the primary fibers into filaments. As the streams of working fluid 103 and 124 are advanced axially downstream from the rotor they merge into a common or third stream of fluid 126. It is believed that such a system employing internal and external surface effect blowers provides increased attenuating force.

Induction heating means 130 as is known in the art can provide sufficient energy to maintain the rotor and molten material at the proper temperatures.

There are several advantages in providing an internal blower that is independent of the rotor 78. If the internal blower assembly 99 is stationary the problems of such a rotating mass are not present, and if desired, the internal blower can be rotated at a different speed and/or a different direction by motive means 96 to alter the shape of the veil and filament orientation within the veil.

If necessary, the internal and external blowers described herein can be adapted to utilize alternative working fluids such as steam or a combustible gaseous mixture to provide heated gaseous blast for materials that have elevated fiberization temperatures, such as glass. Furthermore, sizing and binder materials can be added to the working fluids, in some instances, to provide a system wherein such coatings are applied to the filaments at forming.

As with the system described in FIG. 1 the system set forth in FIG. 2 provides an improvement in rotary fiber forming wherein increased throughputs can be realized with increased control over the process.

It will be appreciated that variations in construction features, as well as substitution of equivalent components and methods, can be undertaken without departing from the spirit and scope of the present invention.

We claim:

1. A method of forming filaments comprising:
   forming a generally cylindrical rotating veil of interengaging primary fibers from a rotor containing filament forming material;
   advancing said veil substantially along a path of advancement along the axis of rotation of said rotor;
   supplying a fluid to the interior of the veil by a conduit having a discharge orifice within said veil;
   providing a continuous surface of revolution within said veil along the path of advancement of said veil;
   and moving the fluid over the exterior of said surface according to the Coanda effect along the axis of rotation into engagement with said veil to attenuate said primary fibers into filaments.

2. The method of claim 1 wherein said surface has an arcuate shape.

3. The method of claim 2 wherein said surface is a dome-shaped member.

4. The method of claim 1 or 3 wherein the fluid is moved along the surface at a velocity of at least 3,000 feet per minute.

5. The method of claim 4 wherein the fluid is moved along the surface at a velocity of at least 4,500 feet per minute.

6. The method of claim 1 or 3 wherein the internal angle between the path of said fluid in contact with said veil at the zone at which said fluid leaves said surface and the axis of rotation is less than 45 degrees.

7. The method of claim 4 wherein said angle is less than 20 degrees.

8. The method of claim 7 wherein said angle is between 0 and 10 degrees.

* * * * *

UNITED STATES PATENT AND TRADEMARK OFFICE
CERTIFICATE OF CORRECTION

PATENT NO. : 4,277,436
DATED : July 7, 1981
INVENTOR(S) : Hasmukh G. Shah and G. Richard Machlan It is certified that error appears in the above—identified patent and that said Letters Patent is hereby corrected as shown below:

At item [75] on the cover page of the patent, the spelling of inventor Shah's first name should be "Hasmukh".

At column 8, line 36, the number "4" should be changed to "6".

Signed and Sealed this

Seventeenth Day of November 1981

[SEAL]

Attest:

Attesting Officer

GERALD J. MOSSINGHOFF

Commissioner of Patents and Trademarks